(12) United States Patent
Smith

(10) Patent No.: US 6,326,939 B1
(45) Date of Patent: Dec. 4, 2001

(54) OPTICAL WAVEGUIDE SYSTEM FOR A FLAT-PANEL DISPLAY

(76) Inventor: Ronald S. Smith, c/o XL Vision, Inc., 10315 102$^{nd}$ Ter., Sebastian, FL (US) 32958

(*) Notice: Subject to any disclaimer, the term of this patent is extended or adjusted under 35 U.S.C. 154(b) by 0 days.

(21) Appl. No.: 09/404,596

(22) Filed: Sep. 24, 1999

(51) Int. Cl.$^7$ .................................................. G09G 3/34
(52) U.S. Cl. ............................. 345/84; 345/32; 385/115; 385/120
(58) Field of Search ....................... 345/32, 87, 31, 345/33, 50, 84; 349/56, 57, 61, 62, 63, 65, 69, 70; 356/359; 385/15, 120, 121, 119, 128, 49–50, 115–118

(56) References Cited

U.S. PATENT DOCUMENTS

| | | | |
|---|---|---|---|
| 3,043,179 | 7/1962 | Dunn | 350/96.27 |
| 3,043,910 | 7/1962 | Hicks, Jr. | 385/121 |
| 3,402,000 | 9/1968 | Crawford | 350/96 |
| 3,819,249 | 6/1974 | Borner et al. | 350/96 WG |
| 3,909,109 * | 9/1975 | Aurenz | 385/116 |
| 3,912,362 | 10/1975 | Hudson | 350/96 B |
| 4,076,378 | 2/1978 | Cole | 350/96.24 |
| 4,116,739 * | 9/1978 | Glenn | 156/169 |
| 4,208,096 | 6/1980 | Glenn, Jr. | 350/96.25 |
| 4,721,851 | 1/1988 | Kogure | 250/227 |
| 4,929,048 * | 5/1990 | Cuypers | 385/116 |
| 4,932,747 | 6/1990 | Russell et al. | 350/96.24 |
| 4,932,776 | 6/1990 | Dowling, Jr. et al. | 356/71 |
| 5,256,868 | 10/1993 | Kaplan et al. | 250/208.1 |
| 5,308,986 | 5/1994 | Walker | 250/370.11 |
| 5,333,052 | 7/1994 | Finarov | 356/359 |
| 5,371,826 | 12/1994 | Friedman | 385/115 |
| 5,381,502 | 1/1995 | Veligdan | 385/115 |
| 5,420,959 | 5/1995 | Walker et al. | 385/143 |
| 5,448,671 | 9/1995 | Wimmer et al. | 385/116 |
| 5,455,882 | 10/1995 | Veligdan | 385/116 |
| 5,600,751 | 2/1997 | Peli | 385/116 |
| 5,621,498 | 4/1997 | Inoue et al. | 355/67 |
| 5,625,736 | 4/1997 | Veligdan | 385/120 |
| 5,636,299 | 6/1997 | Bueno et al. | 385/15 |
| 5,668,907 | 9/1997 | Veligdan | 385/12 |
| 5,684,905 | 11/1997 | Sugawara et al. | 385/120 |
| 5,684,906 | 11/1997 | Sugawara | 385/120 |
| 5,756,981 | 5/1998 | Roustaei et al. | 235/462 |
| 5,808,729 | 9/1998 | Sugawara et al. | 356/71 |
| 5,854,868 | 12/1998 | Yoshimura et al. | 385/50 |
| 5,923,806 | 6/1999 | Sugawara | 385/121 |
| 6,031,511 * | 2/2000 | DeLuca et al. | 345/84 |

* cited by examiner

*Primary Examiner*—Bipin Shalwala
*Assistant Examiner*—Mansour M. Said
(74) *Attorney, Agent, or Firm*—Allen, Dyer, Doppelt, Milbrath & Gilchrist, P.A.

(57) ABSTRACT

A flat display for providing high contrast, low-artifact enlarged optical images. The flat panel display comprises a pixelated input imaging device, a first array of optical waveguides including a bias cut, a first light redirecting layer, a second array of optical waveguides also including a bias cut, and a second light redirecting layer. The first and second arrays of optical waveguides enlarge an input image in first and second directions, respectively. Moiré fringe effects are minimized by one or more of: forming the waveguides of the first and second arrays such that the ratio between the waveguide size of the first array to the waveguide size of the second array is at least 1.25; forming a random distribution of waveguides sizes in the first and second arrays; and tilting the second array with respect to the first array. A ratio between the major dimension of the pixels of the input imaging device and the major equivalent dimension of waveguides is between about 1.20 to 4.0. This particular spatial frequency relationship typically yields a modulation transfer function of between 0.2 and 0.95 at the highest spatial frequency supported by the input imaging device.

19 Claims, 7 Drawing Sheets

OPTICAL WAVEGUIDE SYSTEM FOR A FLAT-PANEL DISPLAY

BACKGROUND OF THE INVENTION

1. Field of the Invention

The present invention pertains in general to the spatial frequency relationship between the optical elements of a flat-panel display.

2. Description of the Prior Art

Devices for enlarging optical images using optical waveguides are well known. Early devices included bundles of optical fibers that were tapered along their length such that the fibers were larger in cross-section at one end than at the other. To produce an enlarged image, the original image was input into the small end of the fiber bundle. The image that emerged from the large end of the fiber bundle was magnified by a factor equal to the ratio of the diameter of the large end to that of the smaller end. While producing the desired effect, these devices often produced poor quality, distorted images because of the difficulty in producing uniform tapers in the large number of fibers required by the devices.

Another technique for producing enlarged images using optical waveguides involved cutting a bundle of optical waveguides at a bias and redirecting the emergent light in a direction normal to the bias cut. As a result of the bias cut, the image emerging from the bundle of waveguides was magnified in one direction. Glenn, Jr. discloses one such technique in U.S. Pat. No. 4,208,096.

In U.S. Pat. No. 3,402,000, Crawford also discloses a fiber optic image enlarger that employs the bias-cut waveguide bundle technique. The Crawford image enlarger includes a first bundle of optical fibers having a bias cut that magnifies an input image in a first direction. The magnified image is then redirected into a second bundle of optical fibers having a bias cut that magnifies the input image in a second direction. The resultant image, therefore, is magnified in two dimensions.

While successful in producing enlarged images, devices based on the prior art typically exhibit problems originating from the inefficient cooperation between the optical structures. A first problem can result from nonuniform spacing between the optical waveguides or from slight variations in alignment of optical waveguide structures. Normally, manufactured bundles of optical waveguides include a certain amount of nonuniformity in the spacing between the individual waveguides. This nonuniformity generally goes unnoticed when images are transmitted through a single bundle of optical waveguides. When multiple bundles of optical waveguides having similar spatial frequencies are coupled together, however, the nonuniformity in spacing or misalignment of the fibers of each bundle causes Moiré fringe patterns that appear as alternating light and dark areas in the transmitted image.

A second problem, may result from inadequate spatial sampling of the optical elements of each optical structure. Typically, light input image devices include a structure comprising an array of pixels each projecting a portion of the input light image. The maximum resolution state of such a device includes adjacent pixels alternating between light and dark. When the input image device is optically coupled to a bundle of optical waveguides each having a dimension similar to the pixel dimension, any misalignment between the pixels and optical waveguides can significantly degrade the output image. Rather than each adjacent waveguide transmitting alternating light and dark light signals in a one-to-one correspondence with the pixels of the input imaging device, each waveguide will transmit light from a portion of a dark pixel and a portion of an adjacent light pixel. At the far end of the optical waveguides, the light and dark components of the light input to each waveguide merge together. As a result, the resolution of the input image is lost, and the output image appears gray.

While in theory the pixels of the input imaging device could be aligned perfectly with each corresponding optical waveguide to provide accurate mapping and transmission of the input image, in practice such a result is not feasible. Manufacturing of such a device would be extremely difficult and prohibitively costly.

These problems are further compounded in devices, such as the Crawford device, that include multiple light transmission interfaces. In these devices, the product of the light transmission characteristics through each optical structure and at each light transmission interface determines the overall quality of the output image. Therefore, any global nonuniformity in either bundle of waveguides or any misalignment of optical structures at the light transmission interfaces serves to compound the negative effects on the output image.

SUMMARY OF THE INVENTION

The object of the invention is to improve the quality of the output image of a device having a pixelated input imaging device and multiple bundles of optical waveguides used for enlarging the input image.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises an input imaging source for supplying an input image. The input imaging source is coupled to a first array of optical waveguides having an input surface and an intermediate output surface. The intermediate output surface is oriented at an angle with respect to said input surface, and each waveguide of the first array comprises a first major cross-sectional dimension. A first light redirecting layer is disposed adjacent to the intermediate light output surface for redirecting the input image emerging from the first array of optical waveguides into a second array of optical waveguides. The second array has an intermediate input surface disposed adjacent to the light redirecting layer and a light output surface oriented at an angle with respect to the intermediate input surface. Each waveguide of the second array comprises a second major cross-sectional dimension. Finally, a second light redirecting layer, through which the input image is projected, is disposed on the light output surface of the second array.

In the preferred embodiment, the input imaging source comprises pixels having a major planar dimension. Also, the groups of waveguides from both the first and second arrays together form an equivalent waveguide size defined by the relationship:

$$E = \sqrt{D_1^2 + D_2^2}$$

where E represents the equivalent waveguide size, $D_1$ represents the first major cross-sectional dimension, and $D_2$ represents the second major cross-sectional dimension. Preferably, a pixel-to-waveguide ratio between the major planar dimension of the pixels of the input imaging source and the equivalent waveguide size is between about 1.2 to about 4.0.

In a further embodiment of the present invention, all of the first major cross-sectional dimensions of the waveguides of the first array are substantially equal, and all of the second major cross-sectional dimensions of the waveguides of the second array are substantially equal. Furthermore, a cross-sectional ratio of the first major cross-sectional dimension to the second major cross-sectional dimension is at least 1.25.

In yet another embodiment of the present invention, all of the first major cross-sectional dimensions vary randomly about a first mean value dimension, and all of the second major cross-sectional dimensions vary randomly about a second mean value dimension.

In still another embodiment of the present invention, both the first and second arrays of waveguides are square arrays where the waveguides are arranged in a plurality of rows and columns. In this embodiment, the first array of optical waveguides is rotated relatively with respect to the second array of optical waveguides to form a rotation angle defined as the angle formed by the corresponding rows of the first and second arrays after rotation.

The flat panel display according to the present invention enjoys reduced susceptibility to output image degradation caused by misalignments and non-uniformities of the optical structures in comparison to the devices of the prior art. The present invention employs a novel approach of formulating a relationship between the dimensions of each structural element of the flat panel display to alleviate the poor image quality and artifacts common in the prior art devices.

It is to be understood that both the foregoing general description and the following detailed description are exemplary and explanatory only and are not restrictive of the invention, as claimed.

The accompanying drawings, which are incorporated in and constitute a part of this specification, illustrate the embodiments of the invention and together with the description, serve to explain the principles of the invention.

DETAILED DESCRIPTION OF THE INVENTION

Reference will now be made in detail to the present preferred embodiments of the invention, an example of which is illustrated in the accompanying drawings. Wherever possible, the same reference numbers will be used throughout the drawings to refer to the same or like parts.

Figure 1:
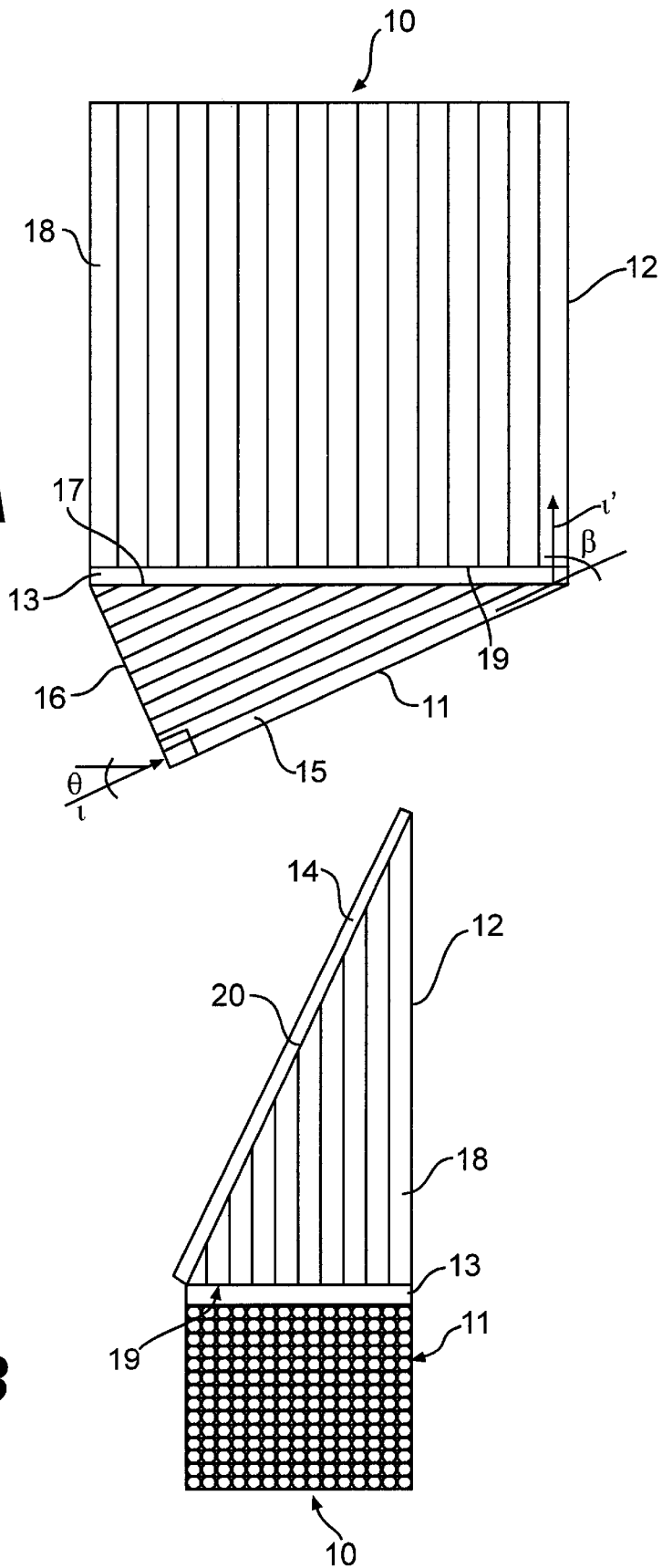
FIG. 1A is a plan view of the optical enlarger portion of the flat panel display.
FIG. 1B is a side view of the optical enlarger portion of the flat panel display.

FIGS. 1A and 1B provide a plan view and a side view, respectively, of the optical enlarger portion 10 of a flat panel display according to the present invention. Optical enlarger portion 10 comprises a first array 11 of optical waveguides 15 coupled to a second array 12 of optical waveguides 18 via a first light redirecting layer 13.

The first array 11 comprises a plurality of optical waveguides 15 fused together to form a coherent bundle. In the preferred embodiment, waveguides 15 are arranged such that their ends form an m×n array. Various methods for fusing the waveguides may be employed including mechanical adhesives, chemical adhesives, or thermal fusing methods. Preferably, waveguides 15 comprise optical fibers each having a circular cross-section with a constant diameter along its entire length. In alternative embodiments, however, waveguides 15 may have square, rectangular, or any other suitably shaped cross-sectional profile. In the preferred embodiment, optical waveguides 15 have a width or diameter, depending on the shape, of about 15 µm; however, the specific choice of waveguide dimension can be varied according to the desired resolution of the flat panel display.

Once waveguides 15 are fused together to form first array 11, the array 11 is cut to form an input face 16 and an intermediate output face 17. Input face 16 is formed by cutting the waveguides 15 in a direction perpendicular to the longitudinal direction of the waveguides 15. Cutting the fibers in this manner improves the transmission efficiency of first array 11. Optical fibers, as is well known, generally include a transparent core surrounded by a cladding having at index of refraction lower than that of the core. Light is transmitted along the longitudinal direction of the optical fibers as a result of total internal reflection of the light traveling along the fiber. Incident light entering the fibers at an angle greater than a critical angle cannot achieve total internal reflection and is therefore lost. Thus, to maximize the efficiency of a fiber optic-based device, incident light should typically enter the fibers as nearly parallel to the direction of the fibers as possible.

Figure 2:
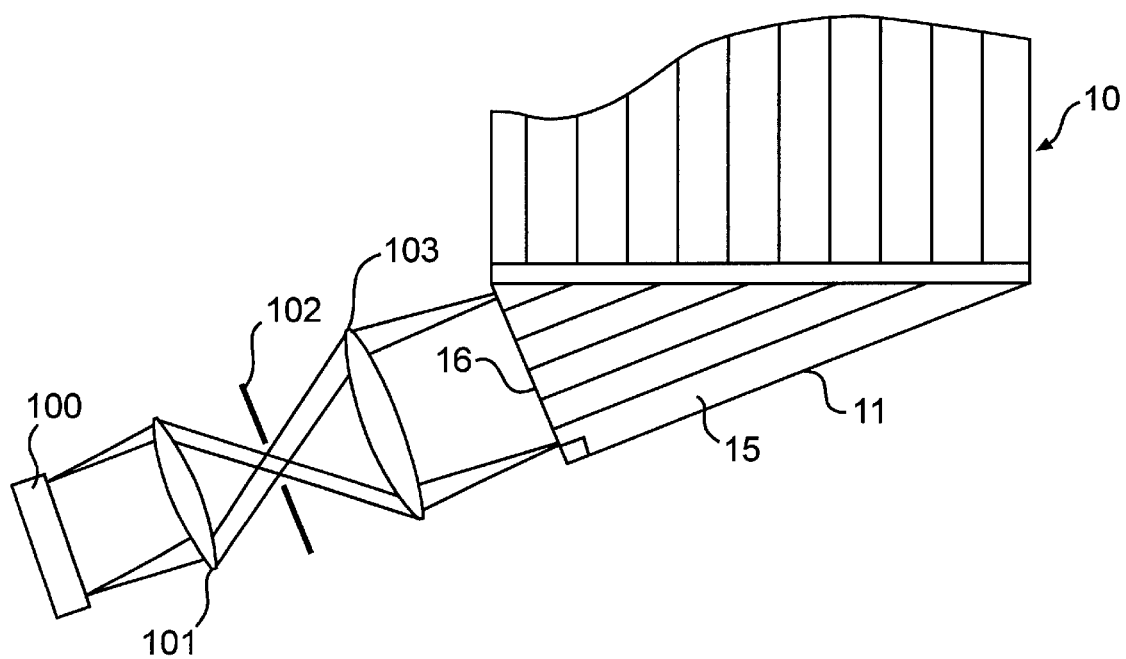
FIG. 2 illustrates the input imaging source and corresponding optics for optically coupling the input imaging source to the optical enlarger portion of the flat panel display.

By orienting the input face 16 of the first array 11 perpendicular to the direction of the optical waveguides 15, light that is incident along direction i and normal to input face 16 is transmitted with high efficiency. This arrangement obviates the need for light redirecting optics at input face 16. Instead, light from an input imaging device 100, as shown in FIG. 2, can be directed into first array 11 along a direction parallel to the optical waveguides 15 without using a light redirecting device. As a result the overall efficiency of the device is improved.

Again referring to FIG. 1, intermediate output face 17 is formed by making a bias cut at an acute angle θ with respect to the longitudinal direction i of the optical waveguides 15.

This bias cut exposes a surface comprising an m×n array of optical waveguides 15. The sections of the optical waveguides 15 formed by the bias cut, i.e. an ellipse for waveguides of circular cross-sections, a rectangle for waveguides of a square cross-section, etc., have a greater surface area than the corresponding cross sectional areas of the waveguides 15 at input surface 16. As a result, an image incident on input surface 16 will emerge at intermediate output face 17 magnified in one direction. The particular magnification factor depends on the angle of the bias cut. As the angle θ of the bias cut is reduced and the section surface area of each of the waveguides 15 increases, the magnification factor is increased according to the relationship:

$$M = \frac{1}{\sin\theta}$$

where M is the magnification factor.

The present invention includes a light redirecting layer 13 disposed adjacent to the intermediate output face 17 of the first array 11. As shown in FIG. 1A, light redirecting layer 13 alters the light propagation direction i of the light emerging from the first array 11 by an angle of β, where β=90°−θ. The light then propagates along direction i', which is parallel to the longitudinal direction of the optical waveguides 18 of the second array 12.

Light redirecting layer 13 may comprise any of the various light redirecting structures known in the art, however, in the preferred embodiment of the present invention, light redirecting layer 13 comprises a holographic optical element (HOE) and more preferably a volume phase HOE. To form the volume phase HOE of the present invention, a photopolymer material such as HRF-750×294-6 from DuPont of Wilimington, Del., is exposed to an interference pattern generated by two coherent beams of radiation. The incident angles of the radiation beams determine the orientation of a slanted fringe hologram internal to light redirecting layer 13. Once fixed with a treatment of ultraviolet radiation, the internal hologram creates effective Bragg gratings that redirect light within the volume of the light redirecting layer 13.

Use of a volume phase HOE in light redirecting layer 13 has several advantages over known techniques. First, because the structure of the volume phase HOE is contained entirely within the boundaries of light redirecting layer 13, conventional methods for bonding the light redirecting layer 13 to the first and second arrays 11 and 12, respectively, may be employed. Conventional transparent adhesives, which typically inhibit the performance of light redirecting layers having surface structure gratings, can be used without negative effects. Second, a light redirecting layer comprising a HOE can typically be made thinner than conventional structures. This property reduces the spreading of light propagating through the light redirecting layer 13 and thereby enhances the MTF and efficiency of the device. In the preferred embodiment of the present invention, light redirecting layer 13 has a thickness in the range of about 5 µm to about 20 µm.

Second array 12 is formed similarly to first array 11. Second array 12 comprises a plurality of optical waveguides 18 fused together to form a coherent bundle. As in first array 11, waveguides 18 are arranged such that their ends form an m×n array. In the preferred embodiment, optical waveguides 18 have a width or diameter, depending on the shape, of about 10 µm; however, the specific choice of waveguide dimension can be varied according to the desired resolution of the flat panel display. Second array 12 also includes an intermediate input face 19 and an output face 20. A second light redirecting layer 14 is disposed adjacent to output face 20.

Intermediate input face 19 of second array 12 is formed by cutting the waveguides 18 in a direction perpendicular to the longitudinal direction of the waveguides 18. Light redirecting layer 13 is disposed adjacent to intermediate input face 19 and redirects light emanating from first array 11 along direction i' or parallel to the longitudinal direction of waveguides 18. Output face 20 is formed by making a bias cut at an acute angle with respect to the longitudinal direction i' of the optical waveguides 18. This bias cut provides the second array 12 with the ability to magnify an image input in a second direction. In the preferred embodiment, the first magnification direction of the first array 11 is perpendicular to the second magnification direction of the second array 12. Furthermore, the bias cuts in first array 11 and second array 12 are preferably configured such that the original aspect ratio of the input light image is preserved.

The present invention also includes a second light redirecting layer 14 disposed adjacent to output face 20 of second array 12. Light redirecting layer 20 alters the light propagation direction of the light emerging from second array 12 according to the requirements of the flat panel display.

Light redirecting layer 14 may comprise any of the various light redirecting structures known in the art, however, in the preferred embodiment of the present invention, light redirecting layer 14, like light redirecting layer 13, comprises a holographic optical element (HOE) and more preferably a volume phase HOE. To minimize the negative effects of light spreading, light redirecting layer 14 is preferably formed with a thickness of from about 5 µm to about 200 µm, dictated primarily by the size of a magnified pixel.

FIG. 2 illustrates the relationship between the input imaging device 100 and the optical enlarger portion 10. Input imaging device 100 preferably comprises a spatial light modulator (SLM) including an array of pixels for providing an input image. Other suitable input devices, including cathode ray tubes and electroluminescent image sources, can also be used. SLM 100 can be optically coupled to the optical enlarger portion of the flat panel display by various methods. FIG. 2 depicts one such method that includes lens 101, aperture 102, and lens 103. Alternatively, any suitable arrangement for optically coupling the light from the input imaging device 100 with the first optical array 11 may be employed. In operation, a light input image from SLM 100 is made incident on input face 16 of optical enlarger portion 10. Because input face 16 is oriented normal to the longitudinal direction of waveguides 15, redirecting optics between SLM 100 and optical enlarger portion 10 are not required.

Figure 3A:
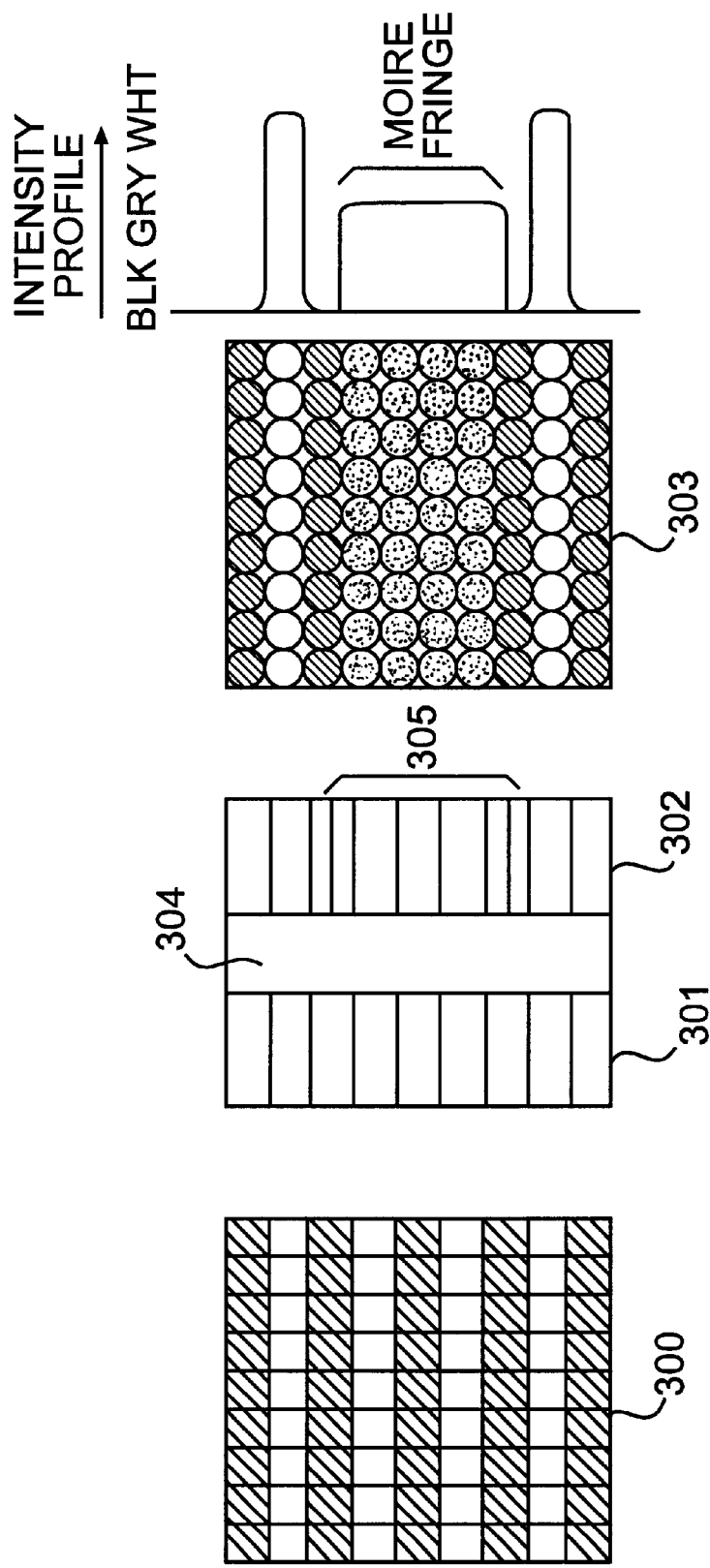
FIG. 3A illustrates undesirable Moire fringe effects caused by nonuniformities in the optical structures.

As described previously, prior art devices having light transmission interfaces between pixelated input devices and bundles of optical waveguides or between two separate bundles of optical waveguides are susceptible to several problems affecting overall image quality. FIG. 3A illustrates one such problem. Input imaging device 100 projects an image 300 comprising alternating light and dark areas. Each light area corresponds to the output of a row of pixels, and similarly, each dark area corresponds to the output of a row of pixels. Elements 301 and 302 depict two separate bundles of optical waveguides, respectively, joined by a light redirecting layer 304. As a result of normal manufacturing processes, fabricated bundles of waveguides typically include globally nonuniform areas 305. These nonuniformities may originate from aberrations in either the size of the waveguides or in the spacing between the waveguides. As a result of these non-uniformities, an output image 303 may include Moiré fringe patterns that are detrimental to the overall output image quality.

Figure 3B:
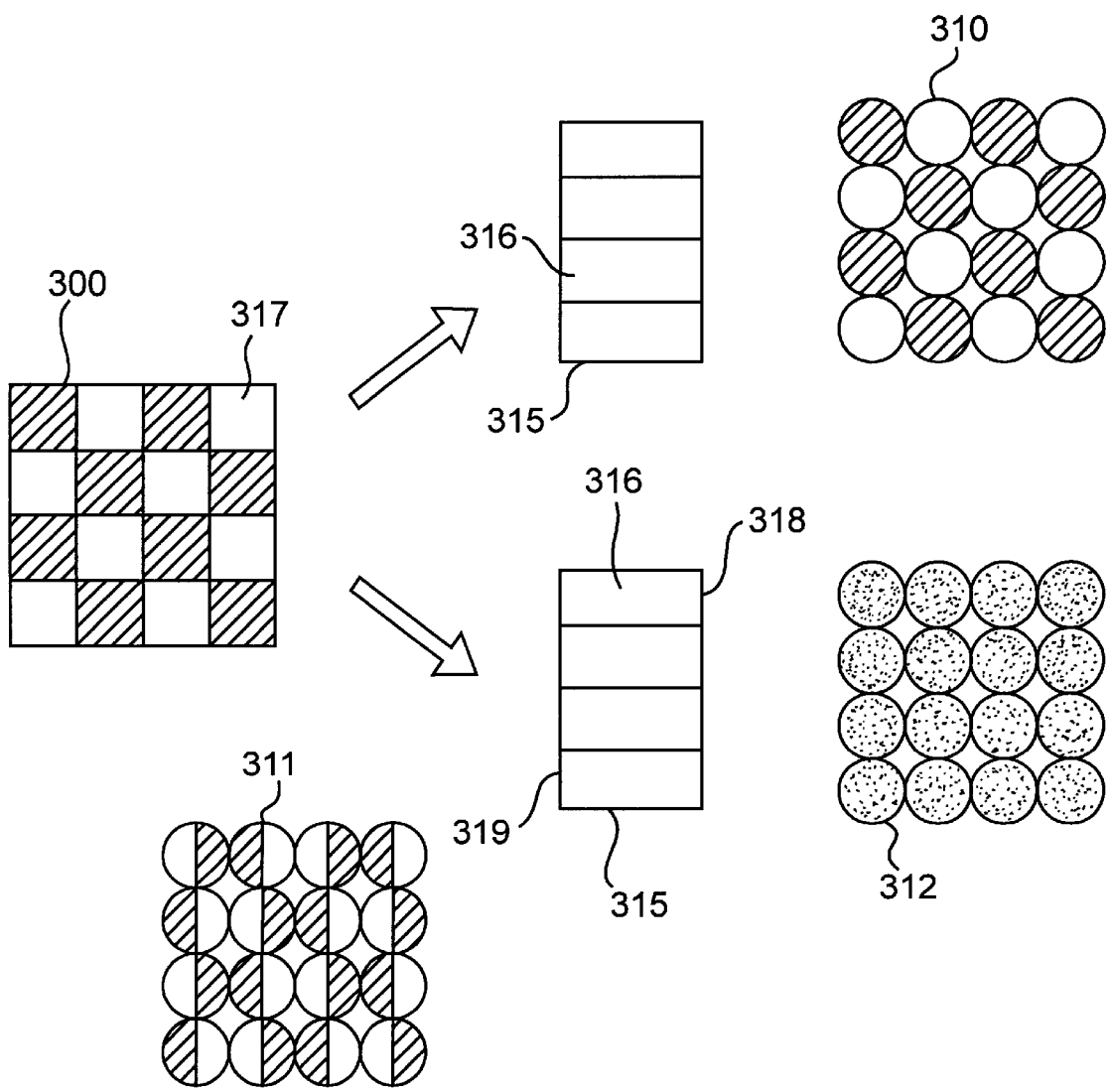
FIG. 3B illustrates the negative effects caused by misalignment at an interface between similarly sized optical structures.

FIG. 3B illustrates a second problem affecting the image quality of the prior art devices. In this example, a bundle of waveguides 315 has a pitch that matches the spacing between the pixels of input image device 300. In theory, the highest transmission efficiency of the combination between the input image device 300 and the bundle 315 occurs when the waveguides 316 are in perfect alignment with the corresponding pixels of input image device 300. Perfect alignment between these elements would yield an output image similar to image 310. In this image, the output of each waveguide directly matches the input received from each pixel 317 of the input imaging device 300. In practice, however, such alignment would be extremely difficult and prohibitively costly to achieve. The same difficulty arises when attempting to align waveguides from two separate bundles that form an interface. Random misalignment between the optical components forming a light transmission interface is common.

Image 312 illustrates the result of a random misalignment at the light transmission interface formed between input imaging device 300 and optical waveguides 316. Similar results occur due to random misalignment at an interface between two separate bundles of optical waveguides as well. Input image 311 depicts the image that is received at input face 319 as a result of misalignment between the pixels 317 of input imaging device 300 and the individual waveguides 316 of bundle 315. As shown by input image 311, the amount of misalignment between the pixels 317 and the waveguides 316 is approximately equal to ½ the pixel pitch; that is, the waveguides 316 have been shifted to the left or right by ½ the pixel pitch. As a result, the input image from each pixel is split and transmitted along adjacent waveguides. In this example, each waveguide must transmit image information comprising both a light component and a dark component. If the waveguides 316 have a length similar to their major cross-sectional dimension, then the resulting image at output face 318 would look similar to image 311. However, where the total length of the optical waveguides is significantly larger than their major cross-sectional dimensions, the components of the input image merge together. As a result of mixing between the light and dark components incident on each waveguide 316, the contrast of the original input image shown on input imaging device 300 is lost, and the output image 312 at face 318 appears as a uniformly gray image.

Figure 4A:
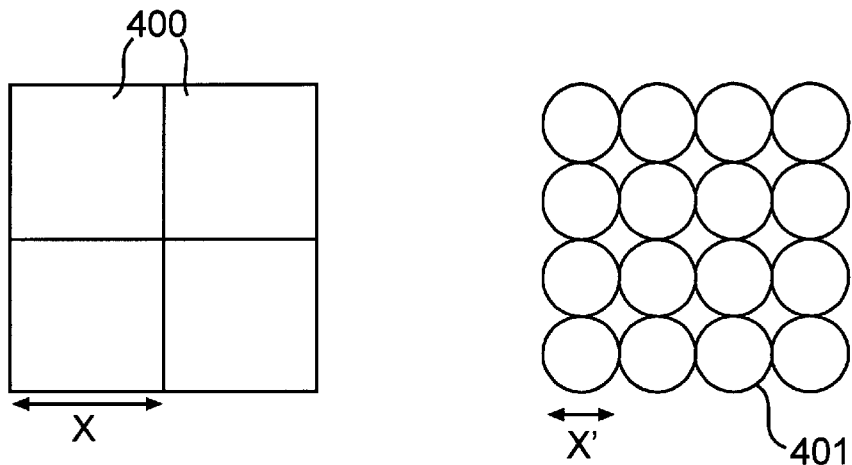
FIG. 4A illustrates the relationship between the input imaging device pixel dimension and the equivalent waveguide size.

The present invention mitigates the problems caused by waveguide non-uniformities and optical element misalignment. The solution to these problems is manifested in the spatial relationships between input imaging device 100, optical waveguides 15, and optical waveguides 18. Particularly, as illustrated in FIG. 4A, pixels 400 forming a square m×n array at input imaging device 100 have square dimensions denoted by X. In the preferred embodiment, the major planar pixel dimension X is in the range of about 20 μm to 50 μm, although other pixel dimensions may be used within the scope of the invention. Next, optical waveguides 15 of the first array 11 and optical waveguides 18 of the second array, when characterized together, exhibit an equivalent waveguide size defined by the relationship:

$$E = \sqrt{D_1^2 + D_2^2}$$

where E represents the equivalent waveguide size, $D_1$ represents the major cross-sectional dimension of waveguides 15, and $D_2$ represents the major cross-sectional dimension of waveguides 18. In the preferred embodiment, a pixel-to-waveguide ratio, defined as the ratio between the major planar dimension X of the pixels 400 and the equivalent waveguide size X', is between about 1.25 to about 4.0. FIG. 4A illustrates array 401, which represents the equivalent array derived mathematically from first array 11 and second array 12. Equivalent array 401 comprises an array of components having an equivalent waveguide size X'. According to the preferred embodiment of the present invention, the ratio between X, the input imaging device pixel size, and X', the equivalent waveguide size, is between about 1.2 and 4.0.

Figure 4B:
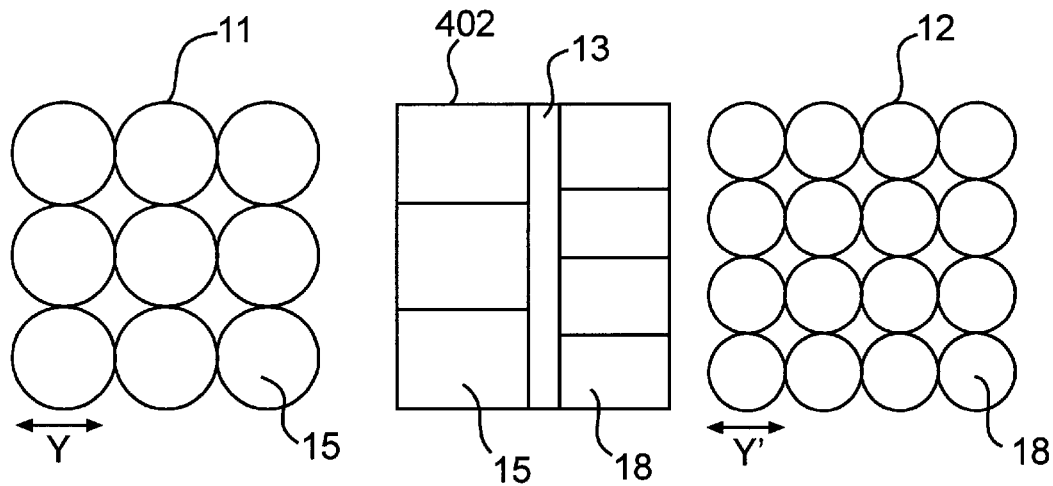
FIG. 4B illustrates a waveguide configuration for minimizing Moire fringe artifacts.

FIG. 4B illustrates one configuration of waveguides 15 and 18 that is useful for alleviating the undesirable artifacts associated with Moiré fringe effects. In this approach, optical waveguides 15 of the first array 11 are formed having a major cross-sectional dimension Y, and optical waveguides 18 of the second array 12 are formed having a major cross-sectional dimension Y'. Further, a cross-sectional ratio between the major cross-sectional dimension Y of optical waveguides 15 and the major cross-sectional dimension Y' of optical waveguides 18 is at least 1.25. Preferably, this ratio is between about 1.25 and about 3.0. Interface 402 depicts the side view of a small group of waveguides 15 and waveguides 18 surrounding the first light redirecting layer 13, according to the present invention.

Figure 5A:
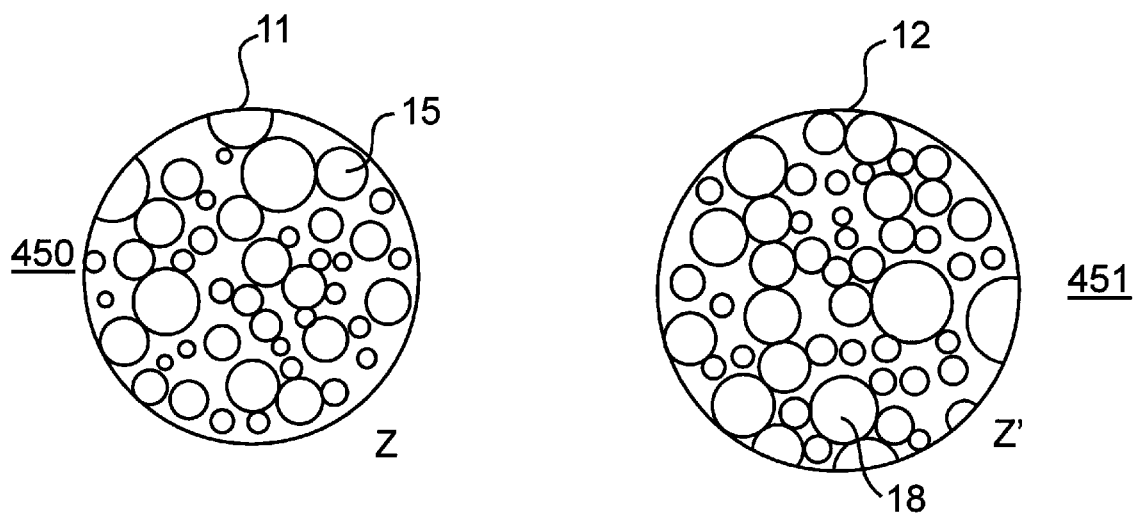
FIGS. 5A and 5B illustrate two additional waveguide configurations for minimizing Moiré fringe artifacts.

FIG. 5A illustrates another technique for minimizing Moiré fringe effects. Views 450 and 451 depict end views of optical waveguides 15 of the first array 11 and optical waveguides 18 of the second array 12, respectively. In this embodiment, the major cross-sectional dimensions of waveguides 15 vary randomly about a first mean value dimension Z. Similarly, the major cross-sectional dimensions of optical waveguides 18 vary randomly about a second mean value dimension Z'. In the preferred embodiment, the mean value dimension Z of the first array 11 is substantially equal to the mean value dimension Z' of the second array 12, and both mean value dimensions are approximately 12.7 μm. Other mean value dimensions, however, are possible within the scope of the invention.

Figure 5B:
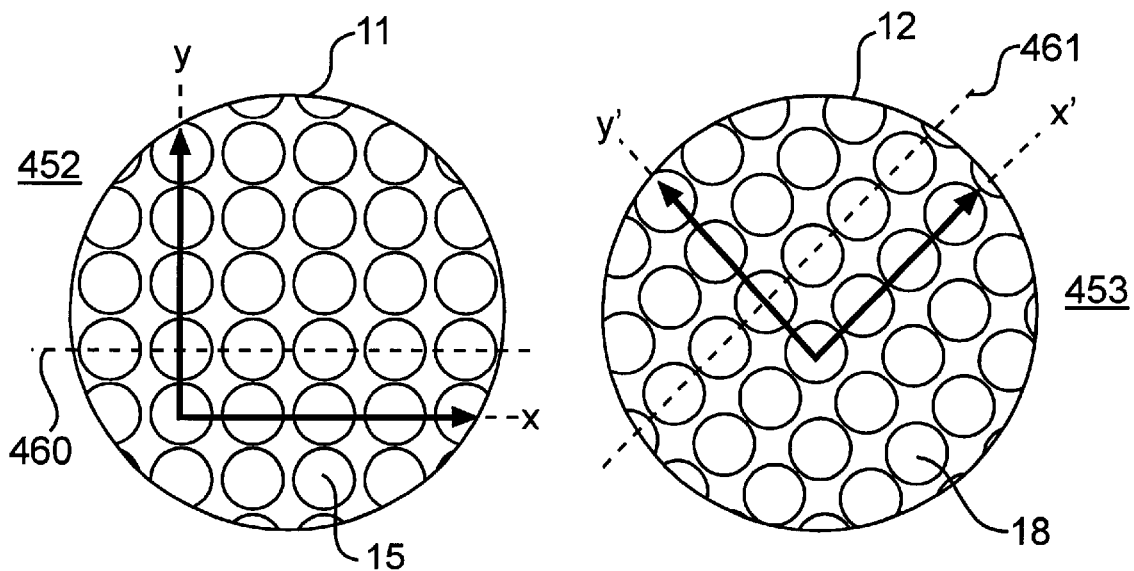

FIG. 5B illustrates yet another technique for minimizing Moiré fringe effects. Views 452 and 453 depict end views of optical waveguides 15 of the first array 11 and optical waveguides 18 of the second array 12, respectively. In this embodiment, optical waveguides 15 of the first array 11 are arranged in a square array oriented along orthogonal axes X and Y. Similarly, optical waveguides 18 of the second array 12 are arranged in a square array oriented along orthogonal axes X' and Y'. In both arrays, directions X and X' extend along the rows of waveguides of the corresponding arrays, and directions Y and Y' extend along the columns of the corresponding arrays. Waveguide arrays 11 and 12 are oriented with respect to each other such that a relative rotation angle is formed between the rows and columns of respective waveguides in both arrays. Specifically, waveguide array 11 is rotated relative to second array 12 to form a rotation angle defined as the angle between corresponding rows (i.e. rows 460 and 461) of arrays 11 and 12, respectively. Thus, the rotation angle is the angle formed, for example, between rows 460 and 461. In the preferred embodiment, the rotation angle is approximately 30 degrees.

The flat panel display having the particular spatial relationships with respect to the pixel size of the input imaging source, the equivalent waveguide size, the physical waveguide dimensions, and the specific waveguide orientations, as defined by the present invention, offers greatly improved image output. Regardless of the particular alignment between pixels 400, waveguides 15, and waveguides 18, there is a substantial sampling of the white and black pixels of the input image, and therefore, very little mixing of light and dark image components occurs within the fibers. As a result, the original contrast of the input image is largely preserved, and a high quality, non-gray output image results.

Figure 6:
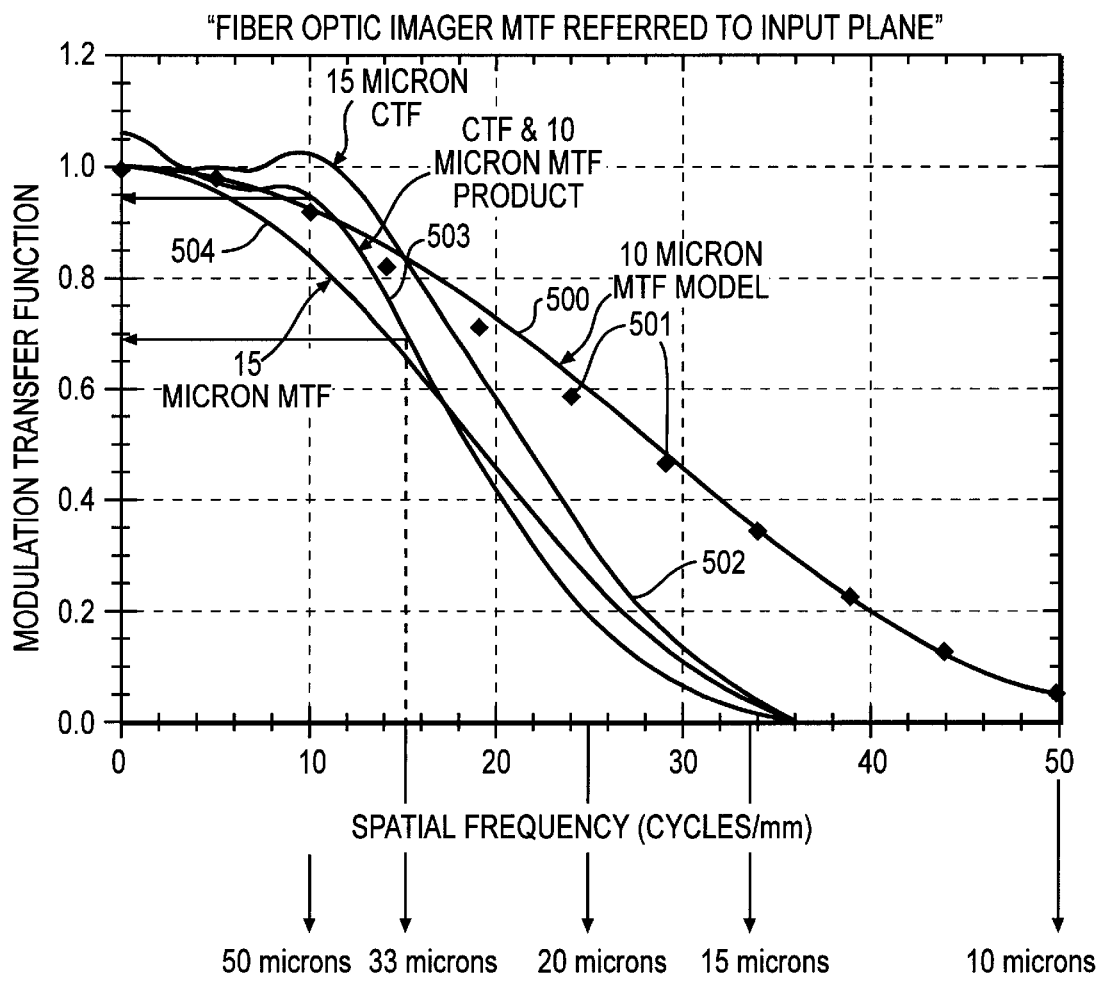
FIG. 6 illustrates modeled data showing response curves of optical elements of the flat panel display and an overall, vertical modulation transfer function (MTF) of the flat panel display along the most sparsely sampled direction, excluding MTF degradation due to the light redirecting layer.
Figure 3A:
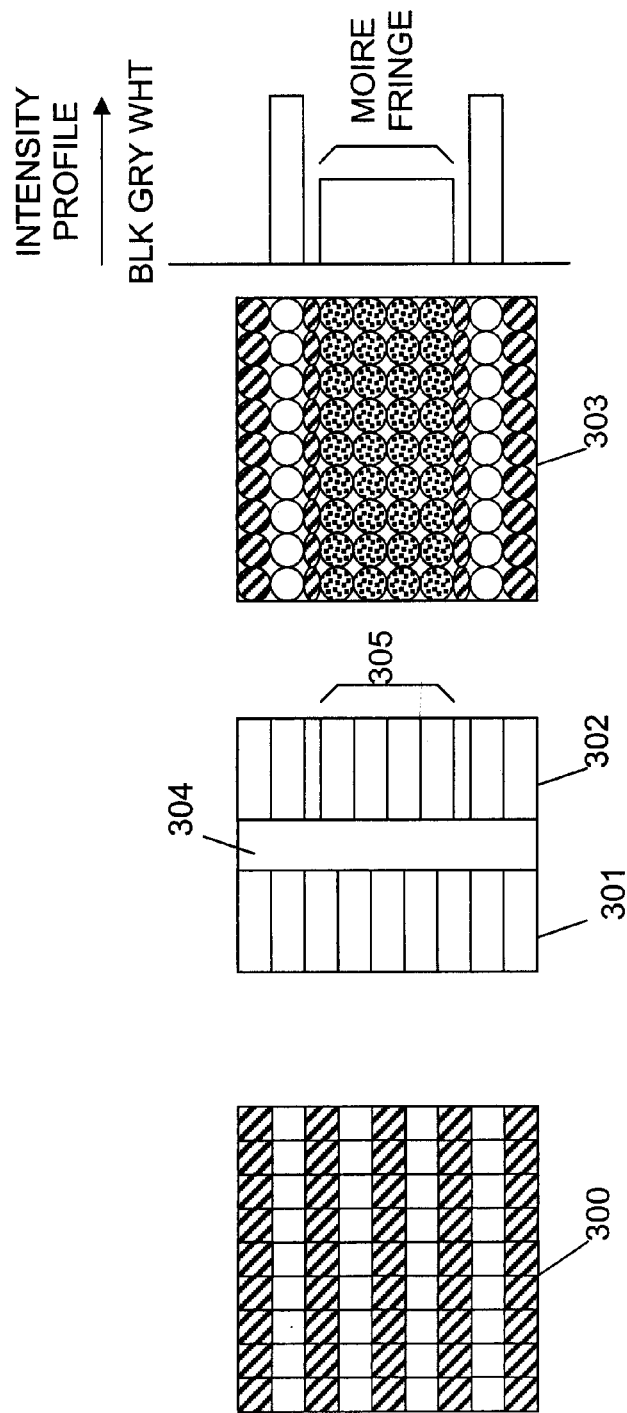

FIG. 6 graphically depicts the modulation transfer function (MTF) of the light guide components for the flat panel display according to one particular set of spatial frequency values within the scope of the present invention. Curve 500 represents the MTF of second array 12 having waveguides 18 each with a major cross-sectional dimension of about 10 $\mu$m. Curve 500 was calculated using a sinusoidal spatial pattern as input, and it closely matches the experimentally obtained MTF data for second array 12, shown as diamond points 501.

To maximize the overall MTF of the flat panel display, a high-contrast square wave input spatial pattern is desirable. Curve 502 represents the contrast transfer function CTF of first array 11, having waveguides 15 with a major cross-sectional dimension of about 15 $\mu$m, in response to a high-contrast square wave input spatial pattern. Curve 504 represents the MTF of first array 11 in response to a sinusoidal spatial pattern. A comparison of curves 502 and 504 shows that a high-contrast square wave input pattern provides a greater modulation than a sinusoidal input at corresponding spatial frequency values. The higher modulation at lower spatial frequencies from a square wave input is due to the presence of higher harmonic Fourier components in the square wave spatial pattern. These higher harmonics serve to increase the modulation according to the following equation:

$$CTF = \frac{4}{\pi}\left[M_N - \frac{1}{3}M_{3N} + \frac{1}{5}M_{5N} - \frac{1}{7}M_{7N} ...\right]$$

where CTF is the contrast transfer function of a square wave input, $M_N$ is the MTF of a sinusoidal input at the spatial frequency of interest, $M_{3N}$ is the MTF of a sinusoidal input at three times the spatial frequency of interest, and so on.

The modulation output of the combination of first array 11 and second array 12 is shown by curve 503, which represents the product of curves 500 and 502. To find the final modulation output of the flat panel display, the spatial frequency of the pixels of input imaging source 100 is compared to curve 503. In a particular example for instance, a flat panel display having 15 $\mu$m waveguides in the first array 11 and 10 $\mu$m waveguides in the second array 12 will exhibit a modulation of about 68% when an input imaging device having pixels of 33 $\mu$m is used. Similarly, if 50 $\mu$m pixels are employed at the input device, the overall modulation would be about 94%.

FIG. 6 is illustrative of only a single example of a specific combination of spatial dimensions according to the present invention. In practice, any suitable dimensions for the optical elements of the flat panel display that fall within the spatial relationship designated by the present invention will provide output images with high MTF and low levels of Moiré artifacts.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A flat panel display comprising:

an input imaging source for supplying an input image, said input imaging source comprising pixels having a major planar dimension;

a first array of optical waveguides optically coupled to said input imaging source, said first array having an input surface and an intermediate output surface, said intermediate output surface being oriented at an angle with respect to said input surface, and wherein each waveguide of said first array comprises a first major cross-sectional dimension;

a first light redirecting layer disposed adjacent to said intermediate light output surface for redirecting said input image;

a second array of optical waveguides, said second array having an intermediate input surface disposed adjacent to said light redirecting layer and a light output surface oriented at an angle with respect to said intermediate input surface, wherein each waveguide of said second array comprises a second major cross-sectional dimension, and wherein the first and second major cross-sectional dimensions form an equivalent waveguide size according to the relationship:

$$E = \sqrt{D_1^2 + D_2^2}$$

where E represents the equivalent waveguide size, $D_1$ represents the first major cross-sectional dimension, and $D_2$ represents the second major cross-sectional dimension;

a second light redirecting layer, disposed on said light output surface, through which said input image is projected; and wherein a pixel-to-waveguide ratio between the major planar dimension of the pixels of the input imaging source and the equivalent waveguide size is between about 1.2 to about 4.0.

2. The flat panel display of claim 1, wherein all of the first major cross-sectional dimensions of the waveguides of the first array are substantially equal, all of the second major cross-sectional dimensions of the waveguides of the second array are substantially equal, and wherein a cross-sectional ratio of said first major cross-sectional dimension to said second major cross-sectional dimension is at least 1.25.

3. The flat panel display of claim 2, wherein said cross-sectional ratio is between about 1.25 to about 3.0.

4. The flat panel display of claim 1, wherein all of the first major cross-sectional dimensions vary randomly about a first mean value dimension, and all of the second major cross-sectional dimensions vary randomly about a second mean value dimension.

5. The flat panel display of claim 4, wherein said first mean value dimension and said second mean value dimension are substantially equivalent.

6. The flat panel display of claim 1, wherein said first array of optical waveguides is rotated with respect to said second array of optical waveguides to form a rotation angle defined as an angle between corresponding rows of the first and second arrays after rotation.

7. The flat panel display of claim 6, wherein said rotation angle is about 30 degrees.

8. The flat panel display of claim 1, wherein said first array magnifies said input image in a first dimension and said second array magnifies said input image in a second dimension.

9. The flat panel display of claim 1, wherein said first light redirecting layer comprises a first holographic optical element.

10. The flat panel display of claim 9, wherein said first holographic optical element has a thickness of from about 5 $\mu$m to about 20 $\mu$m.

11. The flat panel display of claim 1, wherein said first light redirecting layer has a thickness in the range of about 5 $\mu$m to about 20 $\mu$m.

12. The flat panel display of claim 1, wherein said second light redirecting layer comprises a second holographic optical element.

13. The flat panel display of claim 12, wherein said second holographic optical element has a thickness of from about 5 $\mu$m to about 200 $\mu$m.

14. The flat panel display of claim 1, wherein said second light redirecting layer has a thickness in the range of about 5 $\mu$m to about 200 $\mu$m.

15. The flat panel display of claim 1, wherein said input imaging source comprises a spatial light modulator.

16. The flat panel display of claim 1, wherein said optical waveguides of both said first array and said second array have constant cross-sections along their entire length.

17. The flat panel display of claim 1, wherein both said first array of optical waveguides and said second array of optical waveguides comprise coherent bundles of cylindrical optical fibers.

18. The flat panel display of claim 17, wherein said cylindrical optical fibers have constant cross-sections along their entire length.

19. The flat panel display of claim 1, wherein said optical waveguides of both said first array and said second array define longitudinal paths extending along their length, said input surface being disposed normal to said longitudinal paths of said first array, said intermediate output surface being disposed at an acute angle with respect to said longitudinal paths of said first array, said intermediate input surface being disposed normal to said longitudinal paths of said second array, and said light output surface being disposed at an acute angle with respect to said longitudinal paths of said second array.

* * * * *

UNITED STATES PATENT AND TRADEMARK OFFICE
CERTIFICATE OF CORRECTION

PATENT NO. : 6,326,939 B1
DATED : December 4, 2001
INVENTOR(S) : Ronald S. Smith It is certified that error appears in the above-identified patent and that said Letters Patent is hereby corrected as shown below:

<u>Title page,</u>
Item [76], Inventor, please delete "c/o XL Vision, Inc., 103 $102^{nd}$ Ter., Sebastian, FL (US) 32958" and insert -- 2275 Ladner Road N.E., Palm Bay, FL 32907 -- therefor.

<u>Drawings,</u>
FIG. 3A, please delete FIG. 3A and replace with attached FIG. 3A illustrating non-uniform areas (305)

<u>Column 4,</u>
Line 46, please delete "at" and insert -- an -- therefor.

Signed and Sealed this

Sixth Day of January, 2004

JAMES E. ROGAN
*Director of the United States Patent and Trademark Office*